(12) United States Patent
Di Giovanni

(10) Patent No.: US 11,512,647 B2
(45) Date of Patent: Nov. 29, 2022

(54) CAGE FOR A TURBOMACHINE SPEED REDUCER WITH PLANETARY GEAR SET

(71) Applicant: SAFRAN TRANSMISSION SYSTEMS, Colombes (FR)

(72) Inventor: Jean-Charles Michel Pierre Di Giovanni, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 24 days.

(21) Appl. No.: 17/261,794

(22) PCT Filed: Jul. 22, 2019

(86) PCT No.: PCT/FR2019/051819
§ 371 (c)(1),
(2) Date: Jan. 20, 2021

(87) PCT Pub. No.: WO2020/021188
PCT Pub. Date: Jan. 30, 2020

(65) Prior Publication Data
US 2021/0262397 A1    Aug. 26, 2021

(30) Foreign Application Priority Data

Jul. 26, 2018 (FR) ..................................... 1856982

(51) Int. Cl.
*F16H 57/04* (2010.01)
*F02C 7/36* (2006.01)
*F16H 57/08* (2006.01)

(52) U.S. Cl.
CPC .............. *F02C 7/36* (2013.01); *F16H 57/046* (2013.01); *F16H 57/082* (2013.01); *F05D 2220/32* (2013.01); *F05D 2260/40* (2013.01)

(58) Field of Classification Search
CPC ......... F02C 7/36; F16H 57/046; F16H 57/082
See application file for complete search history.

(56) References Cited

U.S. PATENT DOCUMENTS 5,391,125 A * 2/1995 Turra .................... F16H 1/2836
                                                          475/331
5,466,198 A * 11/1995 McKibbin ................ F02C 7/36
                                                          475/346
(Continued)

FOREIGN PATENT DOCUMENTS

EP          1464869 A1    10/2004
FR          2853382 A1    10/2004
(Continued)

OTHER PUBLICATIONS

International Search Report dated Oct. 17, 2019, issued in corresponding International Application No. PCT/FR2019/051819, filed Jul. 22, 2019, 5 pages.
(Continued)

*Primary Examiner* — Derek D Knight
(74) *Attorney, Agent, or Firm* — Christensen O'Connor Johnson Kindness PLLC

(57) ABSTRACT

A planet-carrier cage is provided for a turbomachine speed reducer having a planetary gear set. The cage contains a central sun gear and an annular row of planet gears arranged around the sun gear axis and engaging both the sun gear and an internal gear that surrounds the cage. A periphery of the cage has axial receiving elements configured to receive axial fingers secured to a cage carrier of the speed reducer. Each receiving element is penetrated by a radial spindle that guides the rotation of a connection means, such as a swivel joint or a bearing, which is supported by the fingers. The spindles include means for projecting lubricating oil into regions in which the planet gears mesh with the internal gear.

17 Claims, 5 Drawing Sheets

(56) References Cited

U.S. PATENT DOCUMENTS

| | | | |
|---|---|---|---|
| 7,011,599 B2 | 3/2006 | Becquerelle et al. | |
| 8,727,935 B2* | 5/2014 | Coffin | F02C 3/107 |
| | | | 475/346 |
| 8,777,793 B2* | 7/2014 | Sheridan | F01D 25/16 |
| | | | 475/331 |
| 8,820,478 B2 | 9/2014 | Gauthier et al. | |
| 8,876,647 B2 | 11/2014 | Gallet et al. | |
| 8,900,083 B2* | 12/2014 | Sheridan | F16H 1/2836 |
| | | | 475/331 |
| 8,939,714 B1 | 1/2015 | McCune et al. | |
| 9,267,389 B2* | 2/2016 | Pescosolido | F16H 57/025 |
| 9,328,818 B2* | 5/2016 | Coffin | F16H 57/025 |
| 10,202,905 B2* | 2/2019 | Venter | F02C 7/06 |
| 10,458,279 B2 | 10/2019 | Gedin et al. | |
| 10,724,445 B2* | 7/2020 | Sheridan | F02C 7/36 |
| 2004/0259679 A1 | 12/2004 | Becquerelle et al. | |
| 2014/0087907 A1 | 3/2014 | Coffin et al. | |
| 2019/0301593 A1* | 10/2019 | Lemoine | F16H 57/082 |

FOREIGN PATENT DOCUMENTS

| | | |
|---|---|---|
| FR | 2987416 A1 | 8/2013 |
| FR | 3041054 A1 | 3/2017 |
| FR | 3052213 A1 | 12/2017 |
| WO | 2010092263 A1 | 8/2010 |

OTHER PUBLICATIONS

Written Opinion dated Oct. 17, 2019, issued in corresponding International Application No. PCT/FR2019/051819, filed Jul. 22, 2019, 5 pages.

* cited by examiner

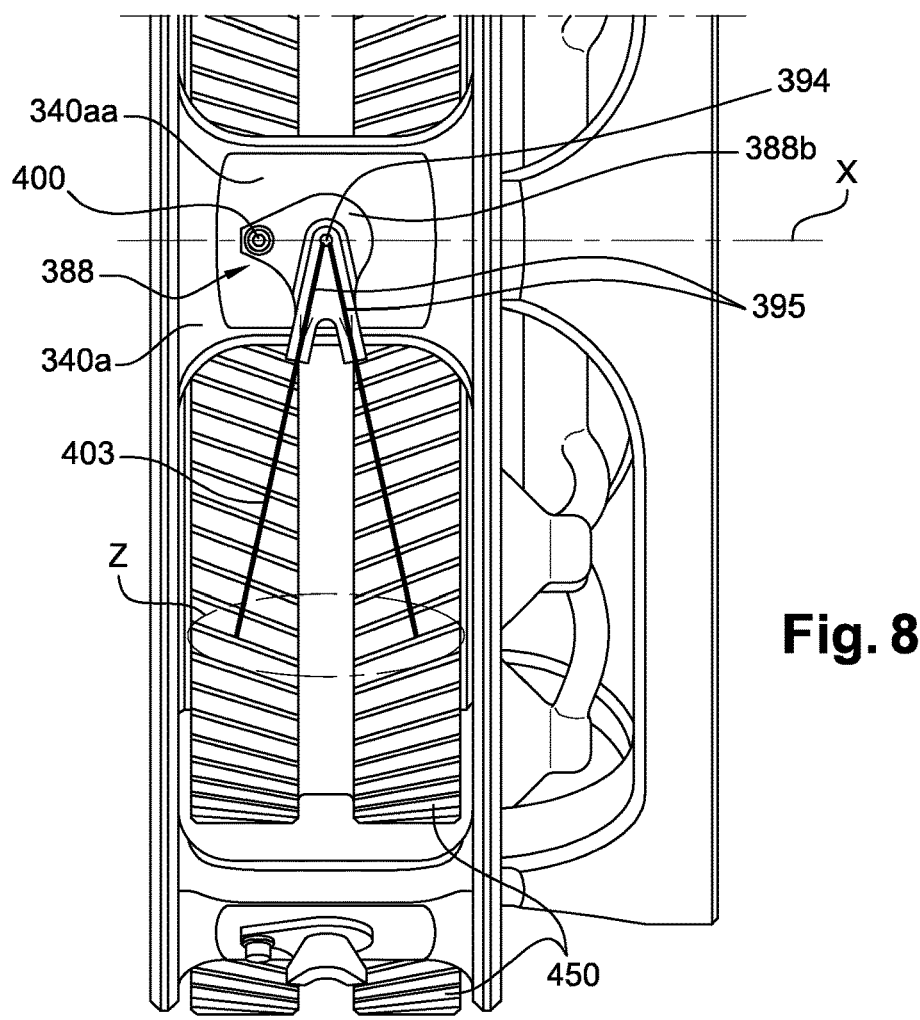
Fig. 8
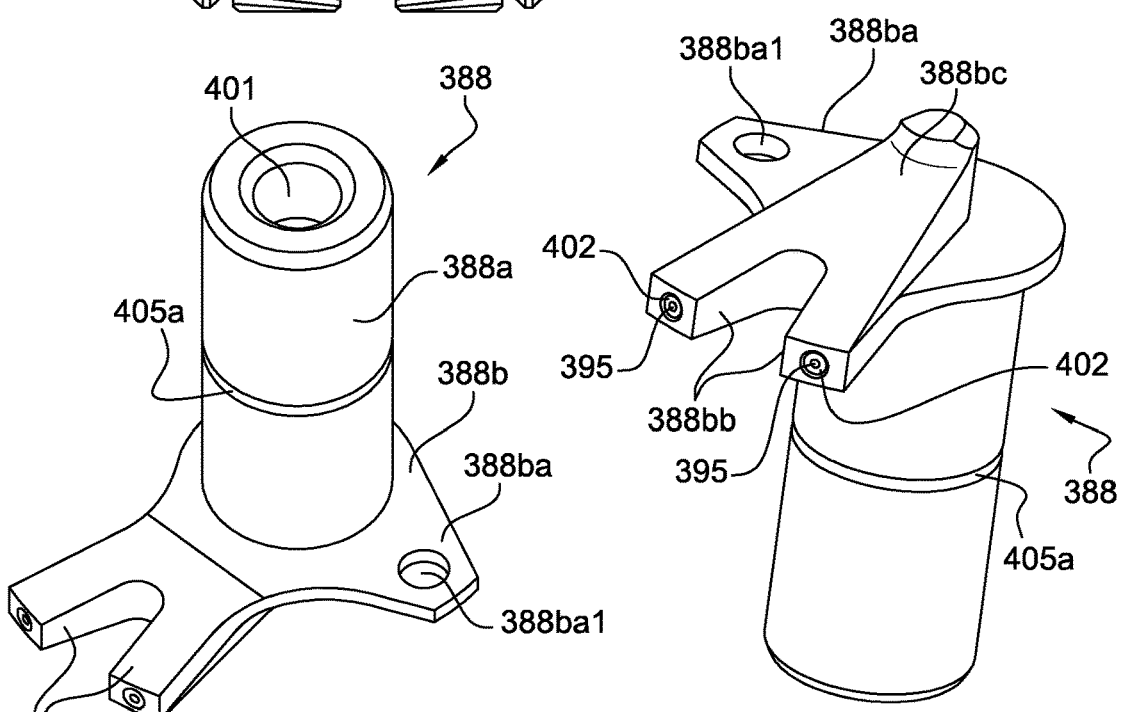
Fig. 9a
Fig. 9b

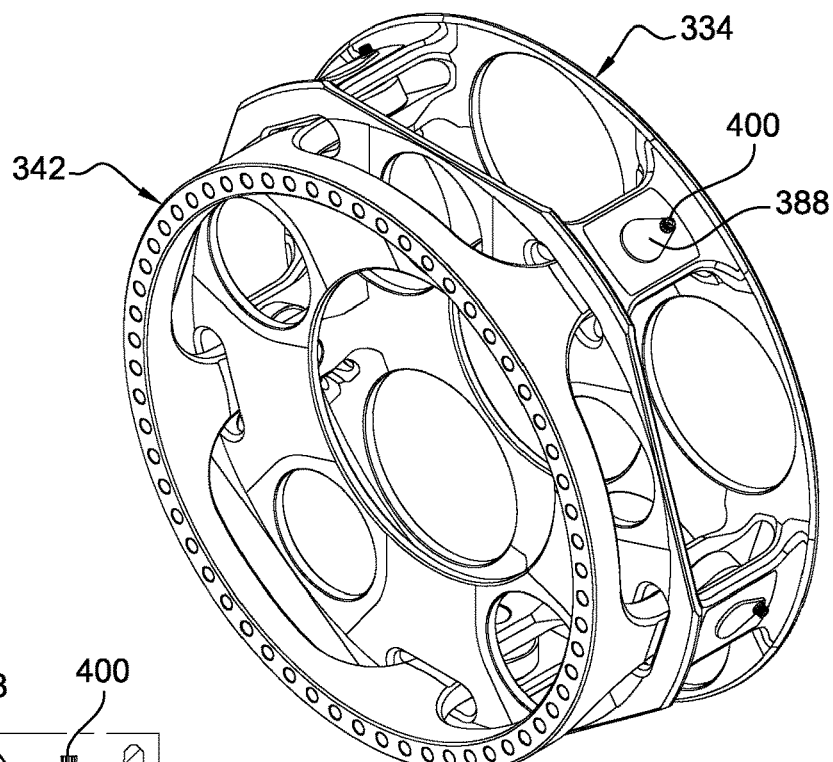
Fig. 10
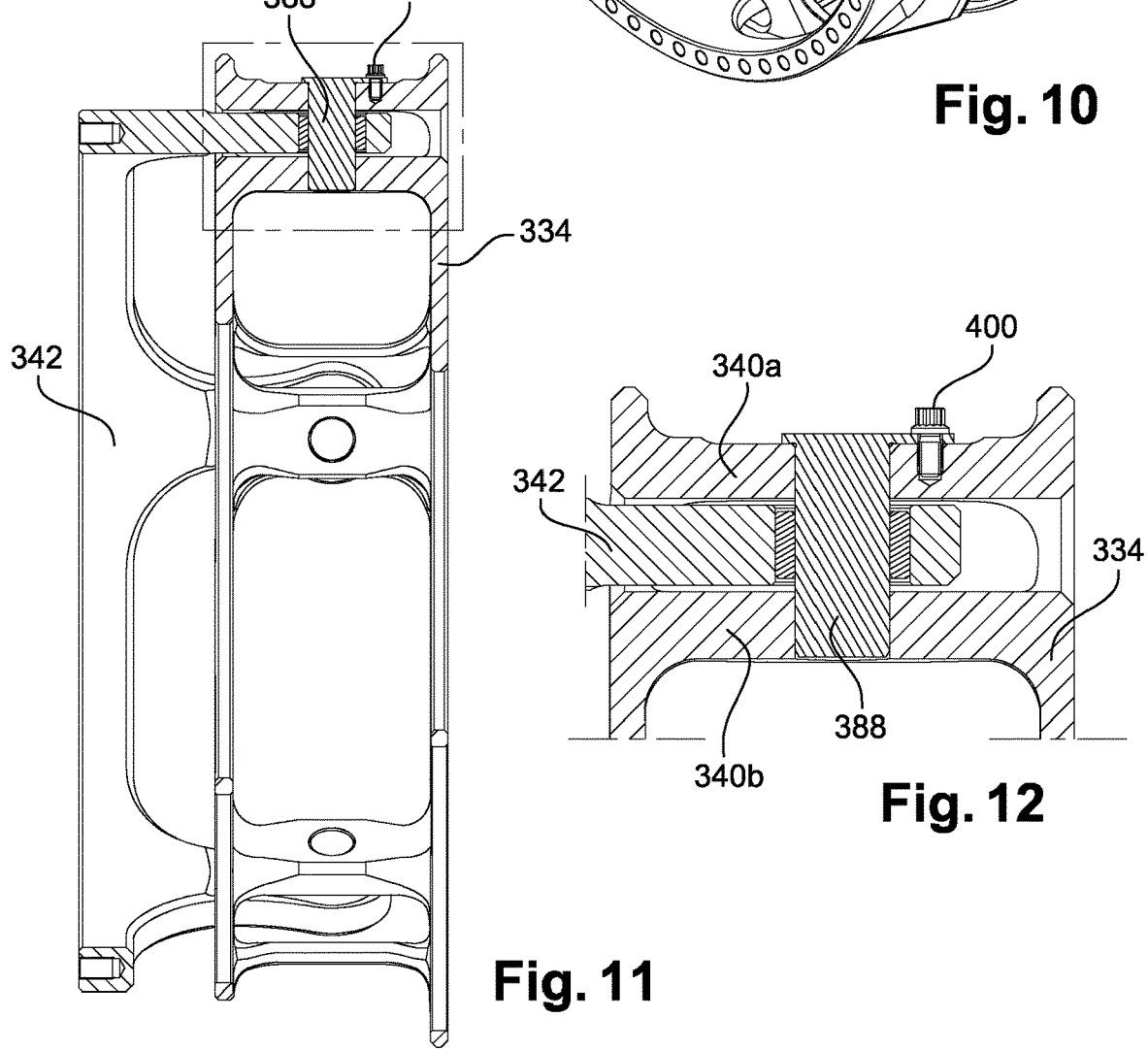
Fig. 11
Fig. 12

CAGE FOR A TURBOMACHINE SPEED REDUCER WITH PLANETARY GEAR SET

FIELD OF THE INVENTION

The present invention concerns the field of speed reducer with planetary or epicyclic gear set for turbomachines, in particular aircraft.

BACKGROUND

The prior art comprises in particular the documents WO-A1-2010/092263, FR-A1-2 987 416, EP-A1-1 464 869, US-A1-2014/087907, FR-A1-3 052 213, FR-A1-2 853 382 and U.S. Pat. No. 8,939,714 and FR-A1-3 041 054.

The role of a mechanical reducer is to change the speed ratio and torque between the input and output axles of a mechanism.

The new generations of dual-flow turbomachines, in particular those with a high bypass ratio, comprise a mechanical reducer to drive the shaft of a fan. Typically, the purpose of the reducer is to transform the so-called fast rotation speed of the shaft of a power turbine into a slower rotation speed for the shaft driving the fan.

Such a reducer comprises a central pinion, called the sun gear, a ring gear and pinions called planet gears, which are meshed between the sun gear and the ring gear. The planet gears are held by a frame called planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetary gears. These axes are parallel to the longitudinal axis X.

There are several reducer architectures. In the prior art of double-flow turbomachines, the reducers are of the planetary or epicyclic gear set type. In other similar applications, there are so-called differential or compound architectures.

On a planetary reducer, the planet carrier is fixed and the ring gear constitutes the output shaft of the device which rotates in the opposite direction of that of the sun gear.

On an epicyclic reducer, the ring gear is fixed and the planet carrier is the output shaft of the device which rotates in the same direction as the sun gear.

On a compound reducer, no element is fixed in rotation. The ring gear rotates in the opposite direction to the sun gear and the planet carrier.

The reducers can consist of one or more gear stages. This meshing is achieved in various ways, such as by contact, friction or magnetic field.

There are several types of contact meshing, such as straight or herringbone toothing.

The planet carrier can be in the form of a cage in which the sun gear, the planet gears, the bearings for guiding the planet gears and means for lubricating the planet gears and the sun gear are housed. The sun gear comprises internal splines for coupling to a first shaft of the turbomachine and the cage of the planet carrier is integral with a cage carrier which comprises a cylindrical portion comprising outer splines for coupling to another shaft.

The connection of the cage to the cage carrier is generally rigid. Alternatively, a technology in which the cage is connected to the cage carrier by flexible connections, as described in the document EP-A1-1 464 869, can be considered. In such a case, the cage carrier comprises an annular row of axial fingers which are connected by flexible connections to the cage.

It has been proposed that these flexible connections should be made by ball joints, the fingers carrying ball joints with cylindrical pins extending into housings provided on the periphery of the cage.

During operation, when the planet carrier is put under torque, the fingers will flex and transmit the torque to the cage. The ball joints prevent the bending of the fingers from being transmitted to the pins. However, for assembly reasons, there are clearances between the pins and the ball joints. Thus, during deformations, relative displacements between the pins and the ball joints occur. These relative displacements on metal-to-metal interfaces generate frictional wear (such as fretting), which can lead to the breakage of the connections.

Furthermore, in current technology, the means for lubricating the reducer are not considered satisfactory to effectively lubricate the meshing and in particular those between the planet gears and the ring gear. For reasons of assembly and accessibility, it is in fact difficult to supply oil to these meshes.

The present invention proposes an improvement which provides a simple, effective and economical solution to at least part of the problems mentioned above.

SUMMARY OF THE INVENTION

The invention relates to a planet carrier cage for a speed reducer with a planetary or epicyclic gear set for a turbomachine, this cage being configured to contain a central sun gear of axis X of rotation and an annular row of planet gears arranged around the axis X and meshed with said sun gear and with a ring gear intended to surround the cage, the cage comprising at its periphery axial housings intended to receive axial fingers integral with a cage carrier of said reducer, each housing being traversed by a substantially radial pin which is intended to guide in rotation a connecting means, such as a ball joint or a bearing, carried by one of said fingers, characterised in that the pins comprise means for spraying lubricating oil into areas in which the planet gears mesh with said ring gear.

The invention thus proposes to use the pins connecting the cage carrier to the cage of the reducer to lubricate the areas in which the planet gears mesh with said ring gear. For this purpose, spraying means are advantageously integrated into the pins. The invention thus proposes to add a "nozzle" function to the connecting pins with a view to lubricating the aforementioned meshing.

The invention further proposes not to limit itself to a ball joint but to provide instead a bearing for guiding the pin in the housing of the cage carrier of the reducer, or any other connection compatible with the pin of the invention. The connecting means may, for example, comprise an annular linear connection.

The invention also relates to a speed reducer with a planetary or epicyclic gear set for a turbomachine, this reducer having an axis X and comprising:

a cage carrier comprising an annular row of axial fingers, each finger comprising a recess for mounting a connecting means, and a planet carrier cage, this cage being configured to contain a central sun gear with an axis X of rotation and an annular row of planet gears arranged around the axis X and meshed with said sun gear as well as with a ring gear intended to surround the cage, the cage comprising at its periphery axial housings in which are engaged the axial fingers integral with the cage carrier, each housing being traversed by a substantially radial pin which is intended to guide in rotation said connecting means which is carried by one of said fingers and which is traversed by said pin, characterised in that the pins comprise means for spraying lubricating oil into areas in which the planet gears mesh with said ring gear.

The cage or the reducer according to the invention may comprise one or more of the following characteristics, taken in isolation from one another, or in combination with one another:

- the pins also comprise means for lubricating said connecting means; the invention thus proposes to bring oil to the ball joints or bearings and in particular to the connecting means/pin interfaces, so as to lubricate their surfaces in contact and thus limit the appearance of fretting; the lubricating means are advantageously integrated in the guiding pins;
- each pin is formed in one piece with a collar for fixing to the cage, this collar comprising at least one boss and/or at least one extension in which said spraying means are formed; the guiding pins are thus easy to produce and relatively economical; the fact that they are made in one piece makes it possible to reduce the radial dimensions and also to simplify their assembly;
- said collar is located at a radially inner or outer end of the pin; it can thus be mounted on the cage from the inside or from the outside;
- said collar comprises an extension forming a bracket and pierced with a hole for a screw intended to be screwed into a threaded hole of the cage, and for example into a threaded hole in an inside or outside bridge of the cage; this enables the oil jets to be correctly directed onto the meshing areas;
- each pin comprises a central bore of oil circulation connected at a radially outer end to one end of at least one oil spraying channel, this channel being oriented in a predetermined direction so as to ensure the spraying of oil in one of the aforementioned areas; the spraying means are thus formed simply by bores and channels provided in the guiding pins;
- at least one and preferably two oil spraying channels are connected to the radially outer end of said central bore; the channels are preferably directed towards the centre of each helix of the gearing; the number of channels and their orientation are determined according to the requirements to ensure optimum lubrication of the planet gears/ring gears; each oil spraying channel can be compared to a nozzle; it is therefore possible to combine one or two or more nozzles per guiding pin, which is advantageous;
- said at least two channels are substantially straight and inclined with respect to each other so as to form a V whose tip corresponds to a point of intersection of the channels and connection to said bore; the angle between the channels and their length can be adjusted to optimise the lubrication;
- each pin comprises at least one channel connected to said central bore and extending between said central bore and an outer cylindrical surface of the pin to be surrounded by said connecting means; the lubricating means are thus formed simply by bores and channels provided in the guiding pins;
- the cage comprises an annular row of connecting members attached thereto, each of which is intended to be interposed between two adjacent planet gears, each member comprising an oil circuit comprising an oil inlet for connection to oil supply means, and an oil outlet which is aligned with a radially inner end of said central bore and which is connected to that end by a tubular bushing; it is thus understood that the guiding pins are not supplied with oil by nozzles but by oil supply members, which makes it possible to guarantee a good supply of oil to the pins and to avoid oil loss during operation;
- each of said members extends axially between two radial walls of the cage and comprises two opposed concave lateral surfaces intended to extend partly around the planet gears between which the member is mounted; each member thus has a shape adapted for mounting it in the cage, between two adjacent planet gears; it thus occupies a space not used in the prior art and makes it possible, by its curved surfaces, to guide the oil in operation as close as possible to the toothing of the planet gears;
- each of said members extends radially between the sun gear and an outer peripheral wall of the cage in which said housings are formed; as in the aforementioned case, the member extends as close as possible to the sun gear and keeps the oil in operation as close as possible to its toothing;
- said collar comprises a boss in which said oil spraying means are formed;
- said collar comprises extensions into which said oil spraying means extend;
- the boss protrudes from the collar and has a generally triangular shape extending substantially from an axis of the pin to free ends of the extensions;
- longitudinal ends of the oil spraying means each lead to a circular counterbore provided at a free end of each extension.

The present invention also relates to a speed reducer with planetary or epicyclic gear set of a turbomachine, comprising a cage as described above and a cage carrier comprising an annular row of axial fingers engaged in the housings on the periphery of the cage preferably forming clevises, each finger comprising a recess for mounting a connecting means, such as a ball joint or a bearing; the pin of said housing passing through it.

The present invention also concerns a turbomachine, in particular an aircraft, comprising a reducer as described above.

BRIEF DESCRIPTION OF THE FIGURES

Other features and advantages will be apparent from the following description of a non-limiting embodiment of the invention with reference to the annexed drawings on which:

FIG. 8 is a partial top view of the reducer of FIG. 6, with a pin cut through a plane passing through the axes of two oil spraying channels, FIGS. 9a and 9b are perspective views of a pin of the reducer of FIG. 6, FIG. 10 is a perspective view of a cage and cage carrier assembly forming the planet carrier of a reducer, FIG. 11 is an axial section view of the planet carrier of FIG. 10, and FIG. 12 is a larger scale view of a detail of FIG. 11.

DETAILED DESCRIPTION OF AN EMBODIMENT OF THE INVENTION

Figure 1:
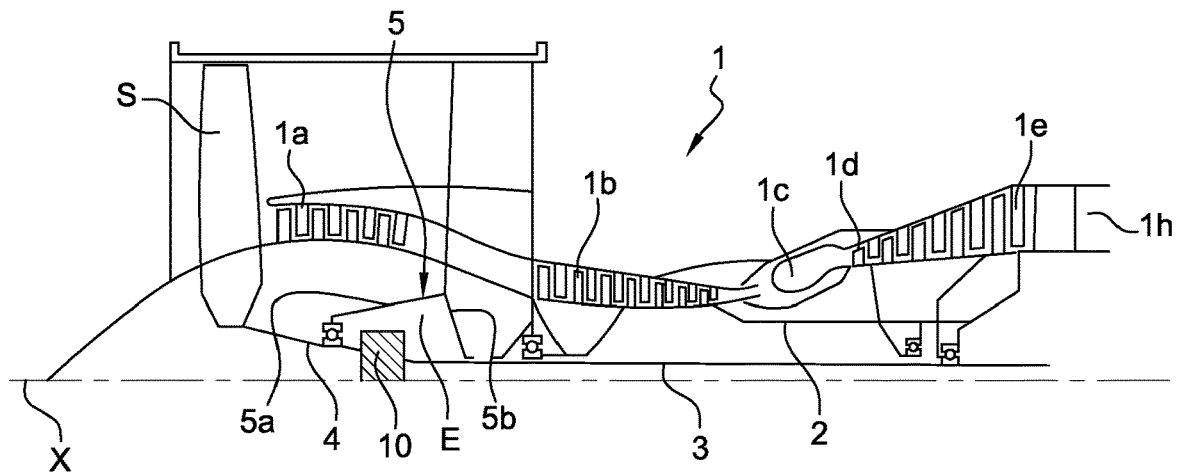
FIG. 1 is a schematic axial section view of a turbomachine using the invention.

FIG. 1 describes a turbomachine 1 which consists, in a conventional manner, of a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form a high-pressure (HP) body with it. The low-pressure compressor 1a and the low-pressure turbine 1e are connected by a low-pressure shaft 3 and form with it a low-pressure body (LP).

The fan S is driven by a fan shaft 4 which is connected to the LP shaft 3 by means of a reducer 10. This reducer is usually of the planetary or epicyclic gear set type.

Although the following description refers to a reducer with planetary or epicyclic gear set, it also applies to a differential mechanical in which its three essential components, namely the planet carrier, the ring gear and the sun gear, are mobile in rotation, the speed of one of these components depends on the speed difference between the other two components.

The reducer 10 is positioned in the front part of the turbomachine. A fixed structure comprising, schematically here, an upstream part 5a and a downstream part 5b which makes up the motor casing or stator 5 is arranged so as to form an enclosure E surrounding the reducer 10. This enclosure E is closed off upstream by seals at a bearing for the fan shaft 4 and downstream by seals at the LP shaft 3 feedthrough.

Figure 2:
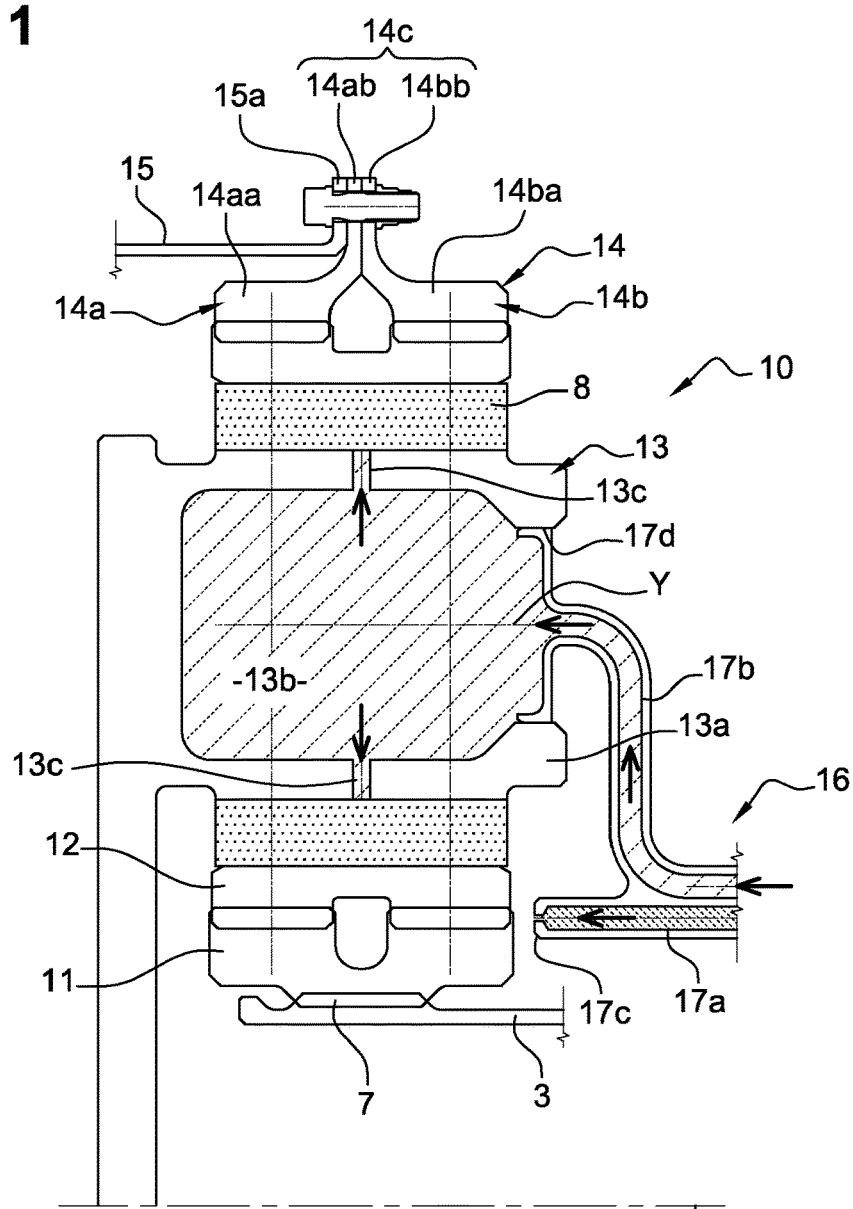
FIG. 2 is a schematic axial section view of a reducer with epicyclic gear set.

FIG. 2 shows a part of a reducer 10 which can take the form of different architectures depending on whether some parts are fixed or in rotation. At the input side, the reducer 10 is connected to the LP shaft 3, for example via splines 7. Thus, the LP shaft 3 drives a planetary pinion called the sun gear 11. Classically, the sun gear 11, the axis of rotation of which is the same as the axis X of the turbomachine, drives a series of pinions called planet gears 12, which are evenly distributed on the same diameter around the axis X of rotation. This diameter is equal to twice the operating centre distance between sun gear 11 and planet gears 12. The number of planet gears 12 is generally defined between three and seven for this type of application.

All the planet gears 12 are held together by a frame called planet carrier 13. Each planet gear 12 rotates around its own axis Y and meshes with the ring gear 14.

At the output of the reducer 10, we have:

In an epicyclic configuration, the set of planet gears 12 drives the planet carrier 13 in rotation around the axis X of the turbomachine. The ring gear 14 is fixed to the engine or stator casing 5 via a ring gear carrier 15 and the planet carrier 13 is fixed to the fan shaft 4.

In a planetary configuration, the planet gear set 12 is held by a planet carrier 13 which is fixed to the engine or stator casing 5. Each planet gear drives the ring gear which is attached to the fan shaft 4 via a ring gear 15.

Each planet gear 12 is mounted freely rotatably by means of a bearing 8, e.g. rolling or hydrostatic bearing. Each bearing 8 is mounted on one of the axles 13a of the planet carrier 13 and all the axles are positioned relative to each other by means of one or more structural frames of the planet carrier 13. There is a number of axles and bearings equal to the number of planet gears. For operational, assembly, manufacturing, inspection, repair or spare parts reasons the axles 13a and the frame can be separated into several parts.

For the same reasons mentioned above, the toothing of a reducer can be separated into several helices. In our example we show the operation of a multi-helix reducer 10 with a ring gear separated into two half-ring gears:

A front half-ring gear 14a consisting of a rim 14aa and a mounting half flange 14ab. On the rim 14aa is the front helix of the toothing. This front helix meshes with that of the planet gear 12 which meshes with that of the sun gear 11.

A rear half-ring gear 14b consisting of a rim 14ba and a mounting half flange 14bb. On the rim 14ba is the rear helix of the toothing of the reducer. This rear helix meshes with the one of the planet gear 12 which meshes with the one of the sun gear 11.

The mounting half flange 14ab of the front ring gear 14a and the mounting half flange 14bb of the rear ring gear 14b form the fixing flange 14c of the ring gear. The ring gear 14 is fixed to the ring gear carrier 15 by assembling the fixing flange 14c of the ring gear and the fixing flange 15a of the ring gear carrier using a bolted assembly for example. In the following, a half flange can be called a flange.

The arrows in FIG. 2 describe the oil flow in the reducer 10. The oil enters the reducer 10 from the stator part 5 into the distributor 16 by various means which will not be specified in this view as they are specific to one or more types of architecture. The distributor 16 is separated into two parts, each of which is usually repeated with the same number of planet gears. The injectors 17a have the function of lubricating the gears, and the arms 17b have the function of lubricating the bearings 8. The oil is fed to the injector 17a and out through the end 17c to lubricate the toothing. The oil is also supplied to each arm 17b and flows through the supply port 17d of the bearing 8. The oil then flows through the axle 13a into buffer zone(s) 13b and out through holes 13c to lubricate the bearings 8 of the planet gears.

Figure 3:
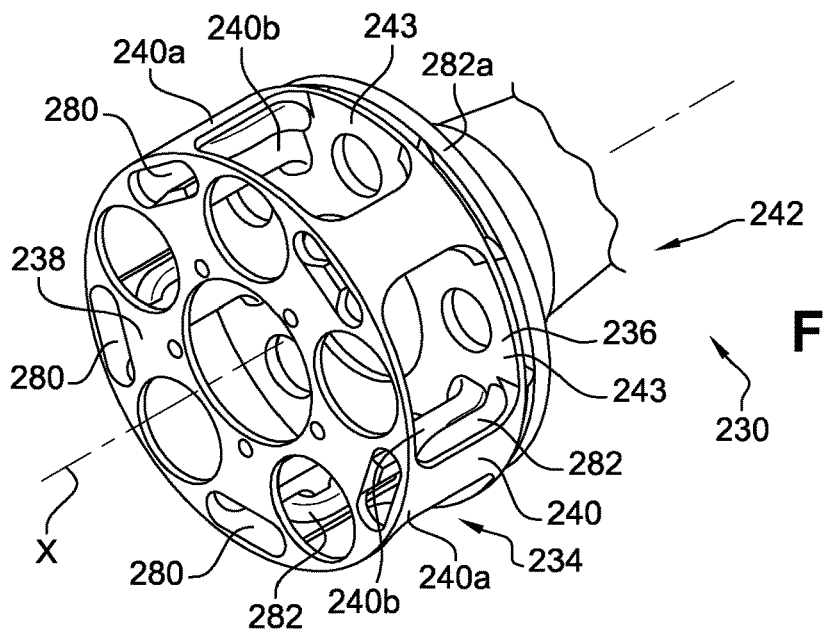
FIG. 3 is a perspective view of a cage and cage carrier assembly forming the planet carrier of a reducer.

In FIG. 3 and following, the elements already described in the above are designated by the same references increased by about a hundred.

Figure 4:
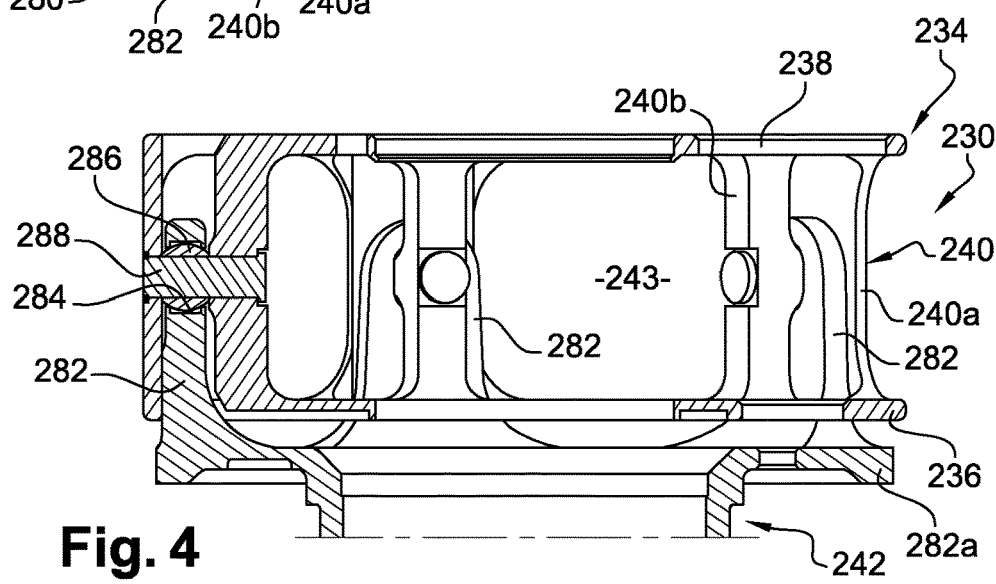
FIG. 4 is an axial and partial sectional view of a part of the planet carrier of FIG. 3.
Figure 5:
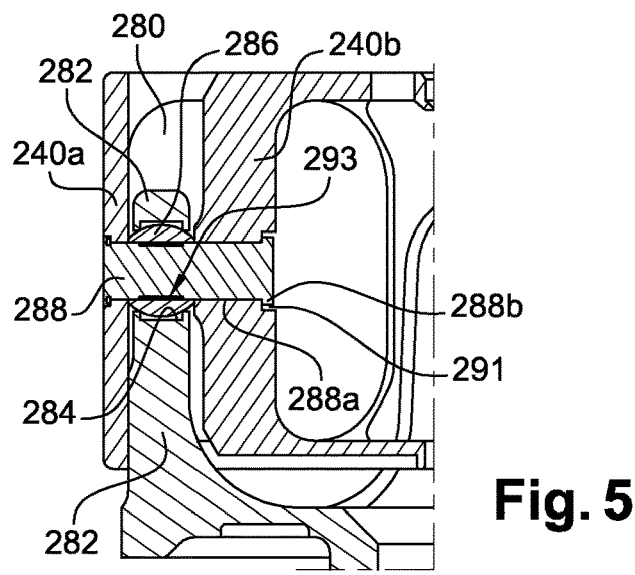
FIG. 5 is a detailed view of FIG. 4.

FIGS. 3 to 5 represent another technology of the planet carrier 230, this planet carrier comprising a cage 234 and a cage carrier 242 connected by ball joint connections.

The cylindrical wall 240 of the cage 234 is here of the double-skinned type and consists of an outer skin 240a interrupted by the lumens 243 and an inner skin 240b interrupted by the same lumens 243. The outer skin 240a separated by five lumens 243 forms five outer bridges and the inner skin 240b separated by five lumens 243 forms five inner bridges. Each pair of lower and upper bridges form a coping to accommodate the finger 282 of the cage carrier 242. In other words, the bridges of each pair define between them a housing 280 for a finger of the cage carrier. The bridges provide the structural connection between the walls 236 and 238. In at least one of the walls 236 and 238, oblong lumens 280 are made in such a way as to allow the finger 282 to pass between the inner and outer bridges.

The cylindrical wall 240 of the cage thus contains an annular row of housings 280. These housings 280 receive the axial fingers 282 which are connected to a substantially radial annular wall 282a of the cage carrier 242. The wall 282a is located at one axial end of the cage carrier 242. The fingers 282 extend axially from the wall 282a and are axially slid into the housings 280.

The thickness and width or radial cross-section of the fingers 282 and the bridges, as well as the diameter of the pins, are determined by calculation. The remaining space is best occupied between each planet gear by controlling the thickness/width ratios. The lights 280 are only the resultant and have the same width as the space left between the outer and inner bridges.

Each finger 282 comprises, approximately in its middle, a recess 284 for mounting the ball joint 286 intended to be crossed by a cylindrical pin 288 carried by the cage 234.

The recess 284 has a substantially radial orientation with respect to the axis X. It has a generally cylindrical shape. The cage 234 and the ball joint 286 have a thickness, measured in a radial direction with respect to the axis X, which is less than the inter-bridge distance or radial thickness of the oblong lumen 280, so that they can be engaged in this housing together with the finger 282 supporting these parts.

Each housing 280 is traversed by a pin 288 which has a substantially radial orientation with respect to the axis X. Each pin 288 comprises a cylindrical body 288a connected at one axial end, here radially inner, to a collar 288b. The pin 288 is here engaged by radial translation from the outside through radial holes in the bridges 240a, 240b, its collar 288b being designed to come into radial contact with a flat face 291 of the outer bridge of the cage 234. After inserting the pin 288 into the holes in the bridges, until the collar 288b rests on the outer bridge, the collar 288b is fixed to this bridge, for example by screwing.

As can be seen in FIG. 5, the ball joint 286 surrounds a cylindrical surface 293 of the pin 288 which can be subjected to fretting in operation.

FIGS. 6 to 9b represent an embodiment of the invention in which the pin 388 comprises both oil spraying means and lubricating means. Alternatively, it could comprise only oil spraying means.

In this embodiment, the ball joint mounted around the pin 388 is replaced by a substantially tubular slide bearing 386. Each finger 382 comprises a recess 384, substantially in the middle, for mounting a bearing 386 intended to be passed through by the pin 388 carried by the cage 334.

Figure 6:
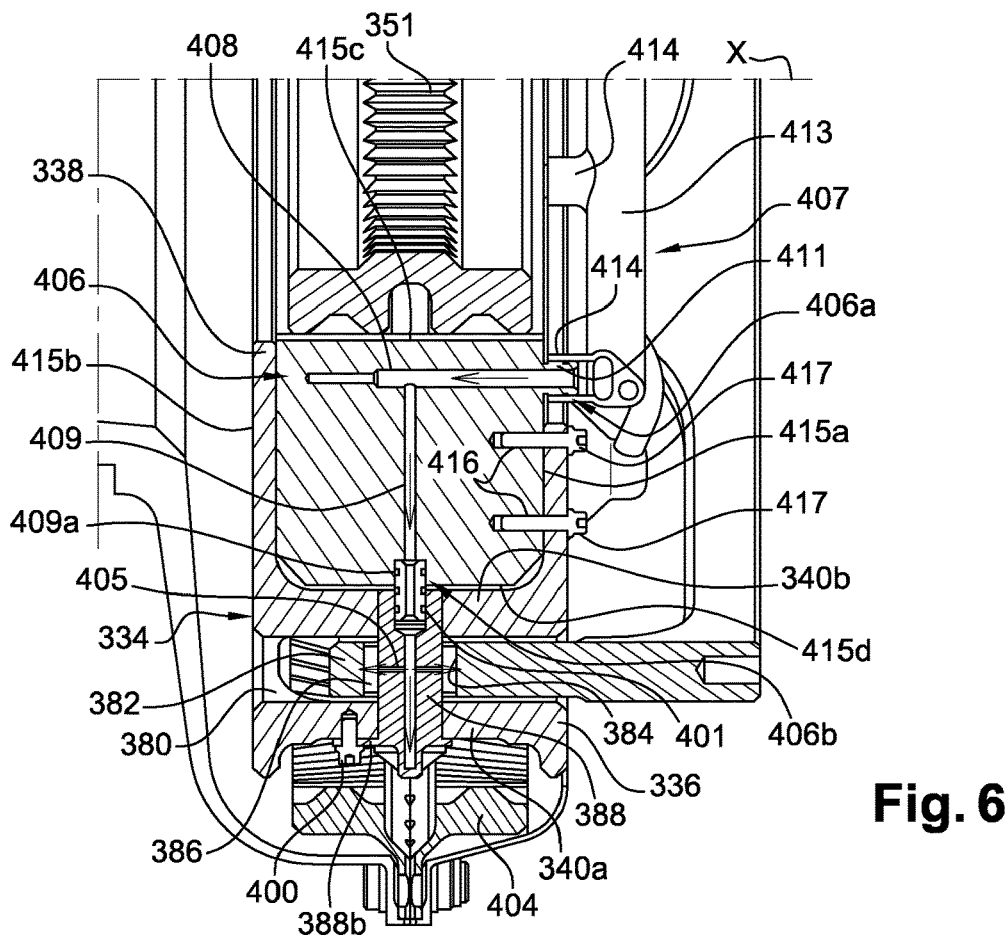
FIG. 6 is an axial sectional view of a reducer according to the invention.
Figure 7:
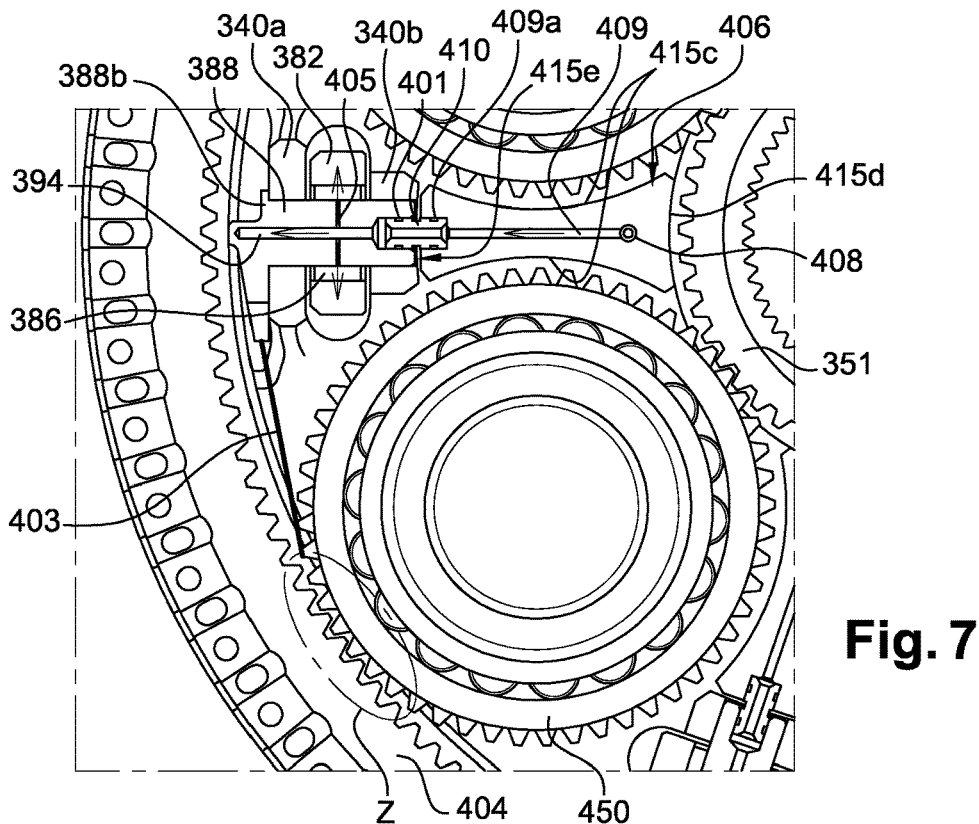
FIG. 7 is a partial cross-sectional view of the reducer of FIG. 6.

As described above, each housing 380 is traversed by the pin 388 which has a substantially radial orientation with respect to the axis X (FIGS. 6, 9a and 9b). Each pin 388 comprises a cylindrical body 388a connected at one axial end, here radially outer, to an outer annular rim or collar 388b. The pin 388 is here engaged by radial translation from the outside through radial holes in the bridges 340a and 340b, its collar 388b being intended to come to rest radially on a radially outer surface 340aa of the outer bridge 340a (FIG. 8). The opposite axial end of the cylindrical body 388a of the pin is free and is flush with a radially inner surface of the inner bridge 340b (FIGS. 6 and 7).

As can be seen in FIGS. 9a and 9b, the collar 388b of each pin 388 comprises an extension 388ba forming a bracket and drilled with a hole 388ba1 for the passage of a screw 400. The screw extends in a substantially radial direction and is screwed from the outside into a threaded hole in the outer bridge 340a (see FIGS. 6 and 8).

After inserting the pin 388 into the holes in the skins, until the collar 388b rests on the outer bridge 340a, the screw 400 is inserted and screwed into the holes in the collar and the skin to fix the pin to the cage. FIG. 8 shows that the collar 388b rests on the surface 340aa of the outer bridge, which is flat and approximately tangential to a circumference centred on the axis X.

The pin 388 comprises a central bore 394 of oil circulation which extends substantially along the axis of the pin. The bore 394 is connected at its radially inner end to a coaxial cylindrical cavity 401 of larger diameter and at its radially outer end to at least one oil spraying channel 395.

In the example shown, there are two channels 395. Each channel is straight and the channels together form a V, as can be seen in FIG. 8 in particular, where a section has been made to visualise these channels.

As can be seen in FIGS. 9a and 9b, the collar 388b comprises additional extensions 388bb and a boss 388bc in which the channels 395 are formed. The aforementioned V-shape has its tip which is located at the level of the axis of the pin and corresponds to the point of intersection of the channels and connection to the bore 394. The extensions 388bb respectively extend along the channels and form the branches of the V. The boss 388bc protrudes from the collar 388b and has a general triangular shape extending approximately from the axis of the pin to the ends of the extensions 388bb.

The channels 395 are generally cylindrical in shape with smaller diameters than the bore 394 (FIG. 8). Their longitudinal ends, located on the opposite side to the bore, may each open into a circular counterbore 402 provided at the free end of each extension 388bb, for example to facilitate the formation of the oil jet at the exit of the channel (FIG. 9b).

The lines 403 in FIGS. 7 and 8 schematically represent the paths of the oil jets exiting channels 395. These trajectories depend, among other things, on the orientation of the channels. The points of impact of the oil jets are located in the areas Z in which the planet gears 450 mesh with the ring gear 404 (FIGS. 7 and 8). In the example shown, each oil jet is directed onto one of the helixes of a planet gear. In our example, the jet is preferably oriented in such a way as to aim at the intersection of the head diameters of the planet gears and the ring gear while being tangent to that of the planet gear.

In addition to the oil spraying means, the pins 388 each comprise means for lubricating the bearings 386. For this purpose, the bore 394 is connected approximately in its centre to at least one channel 405 which extends approximately radially to the axis of the pin and opens out onto the outer cylindrical surface of the pin which is surrounded by the bearing 386 (FIGS. 6 and 7). In the example shown, the channels 405 open at their radially outer ends into a peripheral annular groove 405a in the body of the pin 388 (FIGS. 9a and 9b). The fretting phenomenon mentioned above is reduced by integrating the means for lubricating the bearing 386 into the pin 388.

The pin 388 is advantageously associated with fixing and orientation means for oil jets. In the example shown, it is the screw 400 which performs these two functions because it holds the pin and therefore the channels 395 in a predetermined angular position around the axis of the pin. Alternatively, this function could be performed by a peg, flattener, etc.

In another variant not shown, the collar 388b could be located at the radially inner end of each pin 388, which would then be mounted on the cage from the inside of the cage. Its collar 388b would then be attached to the inner bridge by means of the screw 400.

FIGS. 6 to 8 show the path of the oil to the pin 388.

With regard to the oil supply to the pins 388, an annular row of connecting members 406 are fixed to the cage and are each intended to be interposed between two adjacent planet gears 450 to ensure the supply of oil to the pin located between these planet gears (FIGS. 6 and 7). There are thus as many members 406 as there are pins 388 to be supplied with oil. Alternatively, these connecting members 406 could be an integral part of the cage.

Each member 406 comprises an oil circuit comprising an oil inlet 406a for connection to oil supply means 407, and an oil outlet 406b which is aligned with the cavity 401 and the bore 394 of the corresponding pin. In the example shown, this circuit comprises two straight ducts, a first duct 408 oriented axially (i.e. parallel to the axis X) which is blind at one end and opens at its opposite end on a face, here front, of the member, and a second duct 409 oriented radially with respect to the axis X and which extends between the first duct 408 and a coaxial cavity 409a located opposite the cavity 401 of the pin 388. This cavity 409a forms the above-mentioned oil outlet 406b.

A tubular bushing 410 is sealingly engaged (e.g. by means of O-rings seals) in the cavities 401 and 409a and provides the connection of the bore 394 of the pin to the oil circuit of the member 406 as well as the sealing between the two parts. At the inlet 406a of the circuit, the member comprises a tubular port 411 protruding from the front face which extends line 408 and is connected to oil supply means 407. These supply means 407 may comprise an annular ramp 416 connected to a source of lubricating oil and comprising an annular row of connectors 414 fitted to the ports 411 of the various members 406. The ramp 416 here extends around the axis X and is located in front of the cage of the reducer. O-ring seals can also be provided between the ports 411 and the connectors 414 of the ramp 413.

Each member 406 is preferably designed to occupy a space inside the cage which is not used in the prior art and to optimise oil guidance during operation by its shape. In the example shown, it has a general parallelepipedal shape with two opposite sides curved concavely. The member 406 thus comprises:

two faces, respectively front 415a and rear 415b, which are substantially flat and radial and intended to be located as close as possible to the internal faces facing the annular walls 336, 338 of the cage (FIG. 6),
  two concave curved side faces 415c designed to face two adjacent planet gears, respectively, and to partially surround these planet gears as closely as possible (FIG. 7), and
  two sides, respectively radially inner 415d and radially outer 415e (FIG. 7).

The radially inner face 415d may be concavely curved, as can be seen in FIG. 7, and extend partly around and close to sun gear 351. The radially outer face 415e is preferably flat and located closest to the radially inner surface of the inner bridge. The cavity 409a opens onto this face 415e to receive the bushing 410. The port 411 is located on the front face 415a, which also has threaded holes 416 for screwing screw 417 for fixing the member to the cage. These screws 417 pass through holes in the front annular wall 336 of the cage (FIG. 6). The member 406 is attached to the side 415a on the cage wall 336. There is a clearance between the wall 338 of the cage and the side 415b of the member.

In an embodiment variant not shown, the members 406 could be formed in one piece with the cage. In yet another variant, the ball joint connection 286 and bearing connection 386 could be replaced by another type of flexible connection.

Although the planet carrier visible in FIGS. 10 to 12 does not illustrate the characteristics of the invention relating to the oil spraying means of the pins 388, they make it possible to clearly visualise the shapes and cooperation of the cage 334 and the cage carrier 342 of this planet carrier, and in particular the attachment of pins 388 to the bridges 340a, 340b of the cage by means of the screws 400.

The invention claimed is:

1. A speed reducer with a planetary or epicyclic gear set for a turbomachine, this reducer having an axis and comprising:
  a cage carrier comprising an annular row of axial fingers, each finger comprising a recess configured to mount a connecting means, and
  a planet carrier cage configured to contain a central sun gear with said axis as axis of rotation and an annular row of planet gears arranged around said axis and meshed with said sun gear and with a ring gear that surrounds said planet carrier cage, said planet carrier cage comprising at its periphery axial housings in which are engaged the axial fingers integral with said cage carrier, each housing being traversed by a radial pin that guides in rotation said connecting means which is carried by one of said fingers and which is traversed by said pin, wherein the pins comprise means for spraying lubricating oil into areas in which the planet gears mesh with said ring gear.

2. The reducer according to claim 1, wherein the pins further comprise means for lubricating said connecting means.

3. A speed reducer with a planetary or epicyclic gear set for a turbomachine, this reducer having an axis and comprising:
  a cage carrier comprising an annular row of axial fingers, each finger comprising a recess configured to mount a connecting means, and
  a planet carrier cage configured to contain a central sun gear with said axis as axis of rotation and an annular row of planet gears arranged around said axis and meshed with said sun gear and with a ring gear that surrounds said planet carrier cage, said planet carrier cage comprising at its periphery axial housings in which are engaged the axial fingers integral with said cage carrier, each housing being traversed by a radial pin that guides in rotation said connecting means which is carried by one of said fingers and which is traversed by said pin, wherein the pins comprise means for spraying lubricating oil into areas in which the planet gears mesh with said ring gear, wherein each pin is formed in one piece with a collar configured to fix the pin to said planet carrier cage, the collar comprising at least one of a boss and an extension in which said spraying means are formed.

4. The reducer according to claim 3, wherein said collar is located at a radially inner or outer end of the pin.

5. The reducer according to claim 3, wherein said collar comprises an extension forming a bracket and a hole for the passage of a screw engaging a threaded hole of said planet carrier cage.

6. The reducer according to claim 3, wherein said collar comprises a boss in which said oil spraying means are formed.

7. The reducer according to claim 6, wherein said collar comprises extensions into which said oil spraying means extend.

8. The reducer according to claim 7, wherein the boss protrudes from the collar and has a generally triangular shape extending from an axis of the pin to free ends of the extensions.

9. The reducer according to claim 7, wherein longitudinal ends of the oil spraying means each lead to a circular counterbore provided at a free end of each extension.

10. The reducer according to claim 1, wherein each pin comprises a central bore of oil circulation connected at a radially outer end to one end of at least one oil spraying channel, the channel being oriented to ensure the spraying of oil into one of the areas in which the planet gears mesh with said ring gear.

11. The reducer according to claim 10, wherein at least two oil spraying channels are connected to the radially outer end of said central bore.

12. The reducer according to claim 11, wherein said at least two channels are substantially straight and inclined with respect to each other to form a V having a tip that corresponds to a point of intersection of the channels and connection to said bore.

13. The reducer according to claim 10, further comprising an annular row of connecting members which are fixed to said planet carrier cage and which are each intended to be interposed between two adjacent planet gears, each member comprising an oil circuit comprising an oil inlet configured to connect to oil supply means, and an oil outlet aligned with a radially inner end of said central bore and which is connected to the radially inner end of said central bore by a tubular bushing.

14. The reducer according to claim 13, wherein each of said members extends axially between two radial walls of said planet carrier cage and comprises two opposed concave lateral surfaces configured to extend partly around the planet gears between which the member is mounted.

15. The reducer according to claim 13, wherein each of said members extends radially between the sun gear and an outer peripheral wall of said planet carrier cage in which said housings are formed.

16. A turbomachine, comprising a reducer according to claim 1.

17. An aircraft, comprising a reducer according to claim 1.

* * * * *